Nov. 30, 1965     M. LIPARI     3,220,588

COMPARTMENTAL DISPENSING RECEPTACLE WITH ACCESSORIES

Filed Sept. 17, 1964

INVENTOR
Michael Lipari

BY

ATTORNEY

United States Patent Office 3,220,588
Patented Nov. 30, 1965

3,220,588
COMPARTMENTAL DISPENSING RECEPTACLE WITH ACCESSORIES
Michael Lipari, 14 Ford Ave., Oneonta, N.Y.
Filed Sept. 17, 1964, Ser. No. 397,095
2 Claims. (Cl. 215—11)

This invention relates to compartmental baby formula bottles wherein certain constituents of the formula may be separately stored, sterile and unrefrigerated, in a closed system. The invention particularly relates to the means which serves initially to seal the aperture of the formula bottle and ultimately to rupture the wall which separates the two compartments of the formula bottle thereby permitting admixture of the separated constituents within the closed system.

I will explain the invention with reference to the accompanying drawing, which illustrates one practical embodiment thereof, and will summarize in the claims the novel features of construction, and novel combination of parts, for which protection is desired.

In said drawing:

FIG. 1 is a vertical section through the assembled bottle with nipple attached, and showing the upper and lower compartments of the bottle separated by a rupturable membrane, and showing the rupturing means disposed within the upper compartment in normal inoperative position, and showing the rupturing means serving as a closure for the aperture of the formula bottle and being maintained in such position by being press fitted into the aperture of the bottle; also showing a pliable nipple shield sealed to the periphery of the bottle closure member at the upper end of the bottle.

Figure 1:
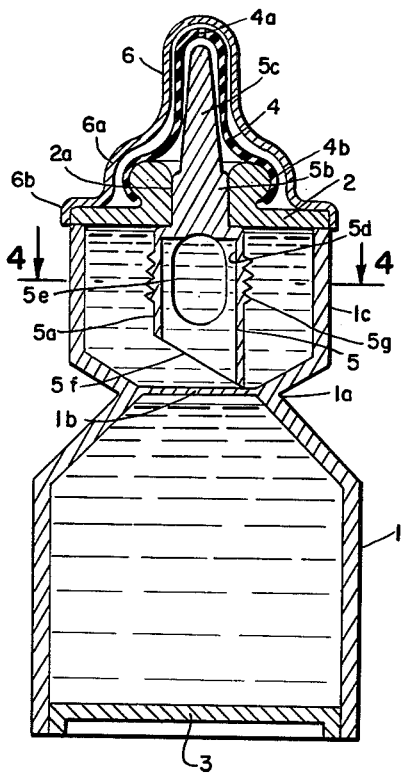

As shown, the bottle is preferably made of plastic material and comprises a lower cylindrical portion 1, open at its lower end and normally closed by a plastic bottom member 3 adapted to be inserted within the lower end of the bottle 1 and then heat-sealed within the bottom of the bottle after the lower compartment of the bottle has been filled with one constituent of the baby formula.

The upper end of the lower portion 1 of the bottle terminates in a V-shaped annular contraction 1a which is normally closed by an integral rupturable membrane 1b to maintain the constituent in the lower compartment of the bottle separated from the constituent in the upper compartment of the bottle.

Figure 3:
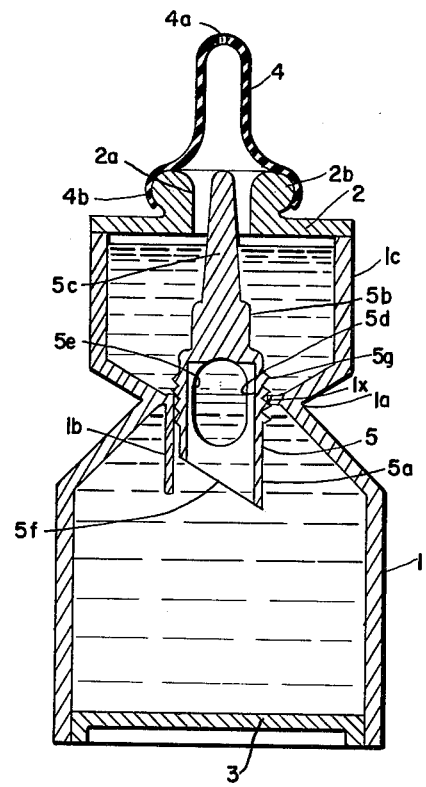
FIG. 3 is a view similar to FIG. 2 showing the rupturing means fully depressed and held in depressed position by the rupturable membrane, and showing the pliable nipple shield removed, the parts assuming their respective operative positions when the baby is ready to accept its feeding.

Above the V-shaped contraction 1a the bottle extends upwardly and cylindrically as at 1c to a substantial distance, and is open at the top. Preferably the upper compartment 1c is of slightly smaller diameter than the lower compartment 1 of the bottle and is of less length. The uppper compartment is adapted to hold a quantity of a second constituent of the baby formula, the top of the upper compartment 1c being closed by a plastic cap 2 as shown in FIGS. 1–3.

After filling the upper compartment 1c, the cap 2 is secured in closed position by heat-sealing the cap 2 to the upper end of the upper compartment 1c, but prior to said heat-sealing a rupturing member 5 is press fitted into the axial bore 2a of the cap 2 as shown in FIG. 1. The cap 2 is enlarged at its center and has an axial bore 2a, and the outer walls of the neck of the bore are rounded to form a circular annular bead 2b to which the nipple 4 of the bottle is attached, the member 4 being in the usual form and having its lower end enlarged as at 4b and engaging the circular bead 2b of the cap 2 as shown, the nipple 4 having at its outer end an aperture 4a through which the contents of the bottle are expelled during the baby feeding operation in the usual manner.

Figure 2:
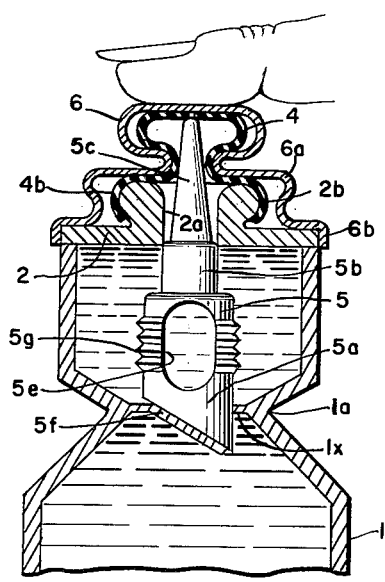
FIG. 2 is a view similar to FIG. 1 showing the rupturing means being depressed by the thumb of the user into position to partially rupture the membrane which separates the two compartments of the bottle.
Figure 4:
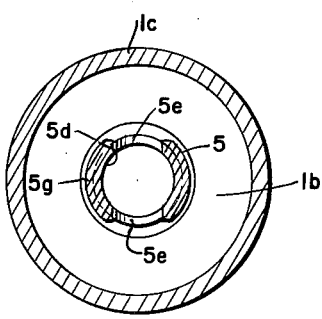
FIG. 4 is an enlarged horizontal section on the line 4—4, FIG. 1.

As shown in FIGS. 1 and 2, when the bottle is not in use the nipple 4 is covered by a nipple shield 6 of general nipple-shape receiving the upper end of the nipple and having its lower portion enlarged as at 6a to conform generally with the shape of the lower end of the nipple, and having its lower end further enlarged as at 6b to closely fit the periphery of the cap 2 of the bottle to which the same may be heat-sealed, the cover 6 preventing contamination of the nipple 4 but having removable from the cap 2 after the separated constituents of the formula in the upper and lower compartments of the bottle have been mixed, as hereinafter explained, just prior to the time when the baby is ready to accept its feeding.

The rupturing means 5, as shown, is generally of cylindrical shape and comprises a hollow cylindrical portion 5a of larger diameter than that of the bore 2a of top 2, and of length to extend from the interior surface level of top 2 to the rupturable membrane 1b, as shown in FIG. 1.

Above the cylindrical portion 5a is a reduced cylindrical portion 5b of length slightly less than the length of the bore 2a and of diameter slightly less than that of the bore 2a, which is press fitted axially into bore 2a, causing the entire surface of portion 5b to bear against the surface of bore 2a, as shown in FIG. 1, thereby sealing the aperture in cap 2 and preventing the constituents in the upper compartment from escaping through bore 2a. Above the reduced portion 5b is a further reduced portion 5c of slightly conical shape and of length to substantially normally fill the interior of the nipple 4, the portion 5c further serving as a means for depressing the rupturing member 5 to rupture the membrane 1b. The member 5 is preferably formed of rigid high-impact plastic.

Preferably the portion 5a is partially hollow as shown in the drawings, the hollowed portion being indicated at 5d and the hollowed portion communicates through slots 5e with the interior of the bottle whereby the components of the upper and lower compartments of the bottle may become admixed when the membrane 1b is ruptured.

As shown, the lower end of the rupturing member 5a is beveled as at 5f so that when the rupturing member is depressed by the thumb of the user, the lower end of the member will rupture the membrane 1b as the rupturing member 5 is depressed in the upper compartment of the bottle into the position shown in FIG. 3 to permit the constituents of the formula within the upper and lower compartments of the bottle to become admixed just prior to the time for baby feeding.

In order to retain the rupturing member 5 in the lowered position shown in FIG. 3, I provide opposed rows of space projections 5g on the member 5a adapted to receive the edge 1x, FIG. 3, of the ruptured portion of membrane 1b, as shown in FIG. 3, thereby maintaining the rupturing member 5 in its lowered position, in which position the constituents of the upper and lower compartments may become admixed, and the mixed constituents withdrawn through the aperture 4a of the nipple 4 during feeding of the baby.

Summarizing, the bottle 1, 2, 3 is made of plastic material. The lower compartment of the bottle may be filled with one constituent and then sealed by heat-sealing member 3 within member 1, as shown. The upper compartment of member 1 may be filled with the second constituent and then sealed by heat-sealing member 2 to member 1c as shown, but the closure and rupturing means 5 must be press fitted axially into the bore 2a of member 2 before the top 2 is sealed to member 1c.

The rupturing means 5 is shifted so as to rupture the membrane 1b which normally separates the upper and lower compartments of the bottle by applying force with the ball of the thumb upon the tip of the stem 5c in a downward direction, thereby moving the closure and rupturing means 5 in a downward direction. The nipple shield 6 should be detached and removed only after the separate constituents of the formula have been mixed and just prior to the moment when the baby is ready to accept its feeding.

I do not limit my invention to the exact form shown in the drawing, for obviously changes may be made therein within the scope of the claims.

I claim:
1. A compartmental dispensing nursing receptacle comprising a bottle having upper and lower compartments each open at one end and separated by a rupturable membrane, each compartment being adapted to hold separate constituents of a nursing formula; a bottom for the open end of the lower compartment; a top for the open end of the upper compartment, said top having a central bore therethrough surrounded by an annular lip; a nipple secured on said lip and extending above the top and having a discharge opening; a nipple shield covering said nipple and removably secured to said top; a combined bore sealing and membrane rupturing member within the upper chamber normally press fitted axially into the bore of said top to normally seal the bore of the top and having a cylindrical portion of length extending down from said top to the surface of the rupturable membrane, said member having a stem of reduced diameter above the cylindrical portion extending upwardly above the bore and into the nipple, and said cylindrical portion having a membrane cutting lower end, whereby when the stem is depressed the membrane will be severed to permit mixing of the constituents of the said compartments, and the bore of the top will be opened to permit withdrawal of the contents of the bottle through the discharge opening after the nipple shield has been removed; the cylindrical portion of the rupturing member being hollow and having lateral openings therethrough to permit intercommunication of the constituents of said compartments therethrough when the rupturing member is depressed; and opposed series of spaced projections on the rupturing member adjacent the lateral openings adapted to be engaged by the wall of the ruptured membrane when the rupturing member is depressed, to maintain said member in depressed position.

2. A compartmental dispensing nursing receptacle comprising a bottle of plastic material having upper and lower compartments each open at one end and separated by a rupturable integral membrane, each compartment being adapted to hold separate constituents of a nursing formula; a bottom of plastic material for the open end of the lower compartment; a top of plastic material for the open end of the upper compartment, said top having a central bore therethrough surrounded by an annular rounded lip; a nipple secured at one end on said lip and extending above the top and having an opening through its other end; an imperforate nipple shield covering said nipple and removably secured to the periphery of said top; a combined bore sealing and rupturing member within the upper chamber normally press fitted axially into the bore of said top to normally seal the bore of the top and having a cylindrical portion of length extending down from said top to the surface of the rupturable membrane, said member having a stem of reduced diameter above the cylindrical portion extending upwardly above the bore to substantially the upper end of the nipple, and said cylindrical portion having an inclined membrane cutting lower end, whereby the stem is depressed the membrane will be severed to permit mixing of the constituents of the said compartments, and the bore of the top will be opened to permit withdrawal of the contents of the bottle through the discharge opening after the nipple shield has been removed; the cylindrical portion of the rupturing member being hollow and having lateral openings therethrough to permit mixing of the constituents of said compartments therethrough when the ruptured member is depressed into membrane severing position; and opposed series of spaced projections on the rupturing member in way of the lateral openings adapted to be engaged by the wall of the ruptured membrane when the rupturing member is depressed, to maintain said member in depressed position.

References Cited by the Examiner
UNITED STATES PATENTS

| 2,653,609 | 9/1953 | Smith | 215—6 |
| 2,721,552 | 10/1955 | Nosik | 215—6 |
| 2,813,649 | 11/1957 | Lipari | 215—11 |

JOSEPH R. LECLAIR, *Primary Examiner.*

FRANKLIN T. GARRETT, *Examiner.*